(12) United States Patent
Tomita et al.

(10) Patent No.: US 9,328,186 B2
(45) Date of Patent: May 3, 2016

(54) THERMOPLASTIC RESIN COMPOSITION FOR VEHICLE LAMP HOUSINGS

(75) Inventors: Hajime Tomita, Osaka (JP); Takayoshi Fujiwara, Osaka (JP); Shunsaku Kubota, Osaka (JP); Suguru Koba, Osaka (JP)

(73) Assignee: NIPPON A&L INC., Osaka (JP)

( * ) Notice: Subject to any disclaimer, the term of this patent is extended or adjusted under 35 U.S.C. 154(b) by 285 days.

(21) Appl. No.: 13/581,791

(22) PCT Filed: Feb. 28, 2011

(86) PCT No.: PCT/JP2011/054490
§ 371 (c)(1),
(2), (4) Date: Aug. 29, 2012

(87) PCT Pub. No.: WO2011/108486
PCT Pub. Date: Sep. 9, 2011

(65) Prior Publication Data
US 2012/0322945 A1   Dec. 20, 2012

(30) Foreign Application Priority Data
Mar. 5, 2010   (JP) ................................ 2010-049649

(51) Int. Cl.
C08L 51/04       (2006.01)
C08L 25/12       (2006.01)
C08F 265/04      (2006.01)
C08L 25/16       (2006.01)
C08L 51/00       (2006.01)

(52) U.S. Cl.
CPC ............. *C08F 265/04* (2013.01); *C08L 25/12* (2013.01); *C08L 25/16* (2013.01); *C08L 51/003* (2013.01); *C08L 51/04* (2013.01); *C08L 2205/02* (2013.01)

(58) Field of Classification Search
CPC ....... C08F 265/04; C08L 25/12; C08L 25/16; C08L 51/04; C08L 51/003
USPC .......................................... 525/70, 73, 77, 78
See application file for complete search history.

(56) References Cited

U.S. PATENT DOCUMENTS

| 4,068,064 A | * | 1/1978 | Platt et al. | ............ | 526/194 |
| 5,430,115 A | * | 7/1995 | Toyooka et al. | ............ | 526/262 |
| 6,140,426 A | * | 10/2000 | Sarabi et al. | ............ | 525/316 |

FOREIGN PATENT DOCUMENTS

| EP | 430134 A2 | * | 6/1991 | ............ C08F 265/04 |
| JP | S51-136777 A | | 11/1976 | |
| JP | H05-220819 A | | 8/1993 | |
| JP | H10-279754 A | | 10/1998 | |
| JP | 2000117920 A | | 4/2000 | |
| JP | 2002-226652 A | | 8/2002 | |
| JP | 2004182835 A | | 7/2004 | |
| JP | 2004-352842 A | | 12/2004 | |
| JP | 2005-139332 A | | 2/2005 | |
| JP | 2005-139332 | | 6/2005 | |
| JP | 2005-139932 | | 6/2005 | |
| JP | 2005264102 A | | 9/2005 | |
| JP | 2006-28393 A | | 2/2006 | |
| JP | A-2006-057047 A | | 3/2006 | |
| JP | 2006-131677 A | | 5/2006 | |
| JP | 2009-155421 A | | 7/2009 | |
| JP | 2009-235187 A | | 10/2009 | |
| WO | 2007/074699 A1 | | 7/2007 | |
| WO | 2010/029937 A1 | | 3/2010 | |

OTHER PUBLICATIONS

Machine Translation of JP 2006-028393.*
Machine Translation of JP 2006-131677.*
International Search Report issued to Application No. PCT/JP2011/054490, mailed May 17, 2011.
Notice of Reasons for Rejection issued to JP Application No. 2012-503123, mailed Dec. 24, 2014.
Office Action in Japanese Patent Application No. JP2012-503123, mailed Jun. 2, 2015.
Notification that the Japan Patent Office has received an Information Statement by a third party issued to JP Application No. 2012-503123, mailed Mar. 24, 2015.

* cited by examiner

*Primary Examiner* — Mark Kaucher
(74) *Attorney, Agent, or Firm* — Knobbe, Martens, Olson & Bear, LLP

(57) ABSTRACT

A thermoplastic resin composition for vehicle lamp housings, includes: 5 to 80 parts by weight of a graft copolymer (A) obtained by graft polymerizing at least one monomer (a-2) selected from the group consisting of aromatic vinyl-based monomers, vinyl cyanide-based monomers, and (meth) acrylic ester-based monomers and maleimide-based monomers, under the presence of an acrylic ester-based rubbery polymer (a-1) having a weight average particle size of 100 to 400 nm; and 20 to 95 parts by weight of a (co)polymer (B) in which at least one monomer (a-2) selected from the group consisting of aromatic vinyl-based monomers, vinyl cyanide-based monomers, (meth)acrylic ester-based monomers and maleimide-based monomers is polymerized, in which a content of total volatiles at 260° C. is no more than 0.7% by weight of the composition overall, and a content of oligomer component having a weight average molecular weight of 200 to 1000 is no more than 0.3% by weight of the composition overall.

4 Claims, No Drawings

THERMOPLASTIC RESIN COMPOSITION FOR VEHICLE LAMP HOUSINGS

CROSS-REFERENCE TO RELATED APPLICATIONS

This application is the National Stage of International Application No. PCT/JP2011/054490, filed Feb. 28, 2011, which claims the benefit of Japanese Application No. 2010-049649, filed Mar. 5, 2010, the entire contents of all of which are incorporated by reference herein.

FIELD OF THE INVENTION

The present invention relates to a thermoplastic resin composition for vehicle lamp housings and a molded article that not only excel in impact resistance, fluidity, gloss, and diffuse reflectance when performing direct vapor deposition on a molded article at an early stage of molding, but also excel in diffuse reflectance when performing direct vapor deposition on a molded article obtained after continuous molding.

BACKGROUND OF THE INVENTION

Generally, vehicle lamp fixtures are structures in which a lens is installed to cover a front opening of a lamp housing, and a light bulb is arranged in a lamp space surrounded by the lamp housing and the lens. Then, in order to effectively use the light bulb, an aluminum film is vapor deposited so as to make the surface on the inside of the lamp housing act as the reflective surface of a reflector. In this case, an aluminum vapor deposition treatment is performed of coating an organic solvent-based acrylic paint on the inside of the lamp housing as an undercoating, following by vapor depositing aluminum, and further coating an organic solvent-based acrylic paint as a top coat in order to protect this vapor deposited surface so as to obtain a product with the surface on the inside of the lamp housing as the reflection surface of a reflector and having a diffuse reflectance of no more than 5%.

In recent years, an abbreviation of undercoat treatment process (so-called direct vapor deposition) has been carried out due to problems of organic solvents impacting the environment, and rationalization by the simplification of the production process and the like. As characteristics of these lamp housings, they have been demanded to possess favorable surface gloss and diffuse reflectance, and in a case of the surface gloss and diffuse reflectance being favorable, the attraction as an automobile part will improve.

In addition, in the production of lamp housings, the continuous molding time tends to be longer for rationalization by simplification of the molding process, productivity improvements, etc. As a result, trouble occurs in that the surface gloss of lamp housings declines and the diffuse reflectance gradually rises, accompanying the adhesion and accumulation of volatile component included in the molding material of lamp housings onto the die.

For example, Patent Document 1 discloses it being possible to improve the poor appearance of molded articles by using a specific AES resin as the thermoplastic resin. Patent Document 2 discloses it being possible to improve the surface appearance during direct vapor deposition, by using a composition blending a specific antistatic agent into a rubber-reinforced resin using a specific rubber-like polymer. In addition, Patent Document 3 discloses it being possible to improve the surface appearance during direct vapor deposition by using an acrylic rubber-reinforced resin using an acrylic rubber arrived at by polymerizing with a specific emulsifier.

However, the surface appearance during direct vapor deposition when performing continuous molding is in no way disclosed in any of the Patent Documents. As a result, in the molded articles obtained during continuous molding, a thermoplastic resin having diffuse reflectance that is superior when performing direct vapor deposition still does not exist, and thus, a thermoplastic resin has been demanded that satisfies the above issues.

Patent Document 1: Japanese Unexamined Patent Application, Publication No. 2004-352842
Patent Document 2: Japanese Unexamined Patent Application, Publication No. 2009-155421
Patent Document 3: Japanese Unexamined Patent Application, Publication No. 2006-131677

SUMMARY OF THE INVENTION

Problems to be Solved by the Invention

The present invention provides a thermoplastic resin composition for vehicle lamp housings and a molded article that not only excel in impact resistance, fluidity, gloss, and diffuse reflectance when performing direct vapor deposition on a molded article at an early stage of molding, but also excel in diffuse reflectance when performing direct vapor deposition on a molded article obtained after continuous molding.

Means for Solving the Problems

The present invention is as follows.
A thermoplastic resin composition for vehicle lamp housings includes: 5 to 80 parts by weight of a graft copolymer (A) obtained by graft polymerizing at least one monomer (a-2) selected from the group consisting of aromatic vinyl-based monomers, vinyl cyanide-based monomers, and (meth) acrylic ester-based monomers and maleimide-based monomers, under the presence of an acrylic ester-based rubbery polymer (a-1) having a weight average particle size of 100 to 400 nm; and 20 to 95 parts by weight of a (co)polymer (B) in which at least one monomer (a-2) selected from the group consisting of aromatic vinyl-based monomers, vinyl cyanide-based monomers, (meth)acrylic ester-based monomers and maleimide-based monomers is polymerized, where a total of (A) and (B) is 100 parts by weight, in which a content of total volatiles at 260° C. is no more than 0.7% by weight of the composition overall, and a content of oligomer component having a weight average molecular weight of 200 to 1000 is no more than 0.3% by weight of the composition overall.

Effects of the Invention

By using the thermoplastic resin composition for vehicle lamp housings of the present invention, it is possible to provide a thermoplastic resin composition for vehicle lamp housings and a molded article that not only excel in impact resistance, fluidity, gloss, and diffuse reflectance when performing direct vapor deposition on a molded article at mold initiation, but also excel in diffuse reflectance when performing direct vapor deposition on a molded article obtained after continuous molding.

DETAILED DESCRIPTION OF THE INVENTION

The present invention will be explained in detail hereinafter.
A thermoplastic resin composition for vehicle lamp housings used in the present invention contains (A) 5 to 80 parts by weight of a graft copolymer, and (B) 20 to 95 parts by weight of a (co)polymer (total of (A) and (B) being 100 parts by weight).

The graft copolymer (A) is obtained by graft polymerizing at least one type of monomer (a-2) selected from the group consisting of aromatic vinyl-based monomers, vinyl cyanide-based monomers, (meth)acrylic ester-based monomers and maleimide-based monomers under the presence of an acrylic ester-based rubbery polymer (a-1).

The acrylic ester-based rubbery polymer (a-1) constituting the graft copolymer (A) can be obtained by polymerizing a (meth)acrylic ester-based monomer, or a (meth)acrylic ester-based monomer with another vinyl-based monomer capable of copolymerization. Furthermore, the acrylic ester-based rubbery polymer (a-1) may contain a polyorganosiloxane component, and may be a core-shell structure with an aromatic vinyl-based polymer as the core component.

Methyl acrylate, ethyl acrylate, propyl acrylate, butyl acrylate, 2-ethylhexyl acrylate, etc. can be exemplified as the (meth)acrylic ester-based monomer, for example, and can be used singly or by combining two or more thereof.

Aromatic vinyl-based monomers such as styrene, α-methylstyrene, p-methylstyrene, t-butylstyrene and dimethylstyrene; methacrylate ester-based monomers such as methyl methacrylate, ethyl methacrylate, propyl methacrylate and butyl methacrylate; vinyl cyanide-based monomers such as acrylonitrile and methacrylonitrile; maleimide-based monomers such as maleimide and N-phenylmaleimide; unsaturated carboxylic acids such as acrylic acid, methacrylic acid, itaconic acid and maleic acid; unsaturated carboxylic acid anhydrides such as maleic anhydride and itaconic acid anhydride; unsaturated epoxy monomers such as glycidyl methacrylate and allyl glycidyl ether; hydroxyl group-containing unsaturated monomers such as hydroxyether acrylate and hydroxyether methacrylate; and the like can be exemplified as the other vinyl-based monomer capable of copolymerization, for example, and can be used singly or by combining two or more thereof. Aromatic vinyl-based monomers and vinyl cyanide-based monomers are particularly preferable as the other vinyl-based monomer capable of copolymerization.

An at least 3-membered ring dimethylsiloxane ring is exemplified as the organosiloxane used in the polyorganosiloxane component, and is preferable a 3 to 6-membered ring. More specifically, hexamethylcyclotrisiloxane, octamethylcyclotetrasiloxane, decamethylcyclopentasiloxane, dodecamethylcyclohexasiloxane and the like are exemplified; however, these can be used independently or by mixing two or more types.

In addition, it is possible to add a siloxane crosslinker and vinyl polymerizable functional group-containing siloxane as necessary. As the siloxane crosslinker, a trifunctional or tetrafunctional silane crosslinker, e.g., trimethoxymethylsilane, triethoxyphenylsilane, tetramethoxysilane, tetraethoxysilane, tetrabutoxysilane, etc. can be used.

The vinyl polymerizable functional group-containing siloxane contains a vinyl polymerizable functional group and can bind with dimethylsiloxane via a siloxane bond, and when taking account of reactivity with dimethylsiloxane, various alkoxysilane compounds containing a vinyl polymerizable functional group are preferred. Specifically, methacryloyloxysiloxanes such as β-methacryloyloxyethyldimethoxymethylsilane, γ-methacryloyloxypropyldimethoxymethylsilane, γ-methacryloyloxypropylmethoxydimethylsilane, γ-methacryloyloxypropyltrimethoxysilane, γ-methacryloyloxypropylethoxydiethylsilane, γ-methacryloyloxypropyldiethoxymethylsilane or δ-methacryloyloxybutyldiethoxymethylsilane; vinylsiloxanes such as tetramethyltetravinylcyclotetrasiloxane; p-vinylphenyldimethoxymethylsilane; and further, mercaptosiloxanes such as γ-mercaptopropyldimethoxymethylsilane and γ-mercaptopropyltrimethoxysilane can be exemplified. These vinyl polymerizable function group-containing siloxanes can be used individually or as a mixture of two or more types.

As a manufacturing method of the polyorganosiloxane component, it is preferable to produce by mixing a mixture containing a dimethylsiloxane-based ring or siloxane-based crosslinker as necessary, and vinyl polymerizable functional group-containing siloxane with an anion-based activator using a homogenizing mixer, ultrasonic mixer or the like, and allowing to condense.

As the anion-based activator, alkylbenzenesulfonates, alkyl sulfates, and/or sodium salts, potassium salts and ammonium salts of these are preferred. Specifically, dodecylbenzenesulfonic acid, octylbenzenesulfonic acid, octyl sulfate, lauryl sulfate, sodium dodecylbenzenesulfonate, sodium octylbenzenesulfonic acid, sodium octylsulfate, sodium lauryl sulfate, and the like are exemplified.

By carrying out polymerization according to a known polymerization method of the polyorganosiloxane component obtained in the aforementioned way and (meth)acrylic ester-based monomer, it is possible to obtain an acrylic ester-based polymer containing a polyorganosiloxane component.

As the aromatic vinyl-based polymer, for example, a polymer obtained by polymerizing an aromatic vinyl-based monomer, or polymerizing an aromatic vinyl-based monomer and an acrylic ester-based monomer or vinyl cyanide-based monomer is exemplified.

The weight average particle size of the acrylic ester-based rubbery polymer (a-1) must be in the range of 100 to 400 nm. If the weight average particle size is less than 100 nm, it will be inferior in impact resistance, and if greater than 400 nm, it will be inferior in diffuse reflectance during direct vapor deposition as well as gloss, and thus not preferred.

It should be noted that, during polymerization of the acrylic ester-based rubbery polymer (a-1), the weight average particle size can be easily controlled to the range of 100 to 400 nm, by adjusting the auxiliary agents, e.g., types of emulsifier, polymerization initiator, etc. and usage proportions, polymerization time, and the like.

The gel content of the acrylic ester-based rubbery polymer (a-1) in toluene solvent and degree of swelling are not particularly limited to ranges so long as not inhibiting the object of the present invention. Typically, the gel content is preferably at least 85% and the degree of swelling 6 to 35, and more preferably the gel content is at least 90% and the degree of swelling 8 to 25. In a case of the gel content and degree of swelling being in these ranges, a thermoplastic resin composition tends to be obtained yielding a lamp housing molded article excelling in gloss and diffuse reflectance at an early stage and after continuous molding.

As the manufacturing method of the acrylic ester-based rubbery polymer (a-1), a known polymerization method can be employed, e.g., known methods such as of emulsion polymerization, solution polymerization, suspension polymerization and block polymerization.

As the emulsifier used in emulsion polymerization, it is possible to use a known emulsifier, e.g., an anionic emulsifier such as sodium dodecylbenzenesulfonate, sodium oleate and dipotassium alkenyl succinate, or nonionic emulsifier such as polyoxyethylene nonylphenyl ether.

As the polymerization initiator used in emulsion polymerization, it is possible to use a known polymerization initiator. As the polymerization initiator, for example, it is possible to independently use an inorganic initiator such as persulfates such as potassium persulfate, sodium persulfate and ammonium persulfate, organic peroxides such as t-butylhydroxyperoxide and cumene hydroxyperoxide, azo compounds and the like, or use a redox initiator combining with this organic peroxide a reducing agent component such as sulfite and sodium formaldehydesulfoxylate. It is possible to further use a polymerization chain transfer agent as necessary, e.g. t-dodecylmercaptan or the like. In addition, polyvinyl alcohols, tricalcium phosphate and the like are exemplified as suspension stabilizers, for example.

The graft copolymer (A) can be obtained by graft polymerizing at least one type of monomer (a-2) selected from the group consisting of aromatic vinyl-based monomers, vinyl cyanide-based monomers, (meth)acrylic ester-based monomers and maleimide-based monomers, with the acrylic ester-based rubbery polymer (a-1) obtained as described above.

The graft copolymer (A) is particularly preferably a graft copolymer grafting an aromatic vinyl-based monomer and vinyl cyanide-based monomer to the acrylic ester-based rubbery polymer (a-1), or a graft copolymer grafting an aromatic vinyl-based monomer and (meth)acrylic ester-based monomer with the acrylic ester-based rubbery polymer (a-1), or a graft copolymer grafting an aromatic vinyl-based monomer, vinyl cyanide-based monomer and (meth)acrylic ester-based monomer with the acrylic ester-based rubbery polymer (a-1). As the rubbery polymer, a case of using a conjugated diene-based rubbery polymer such as polybutadiene is not preferable due to the gloss and the diffuse reflectance of the lamp housing molded article being inferior.

As the aromatic vinyl-based monomer that can be selected as the monomer (a-2), for example, styrene, α-methylstyrene, p-methylstyrene, t-butylstyrene, dimethylstyrene and the like are exemplified. The aromatic vinyl-based monomer can be used singly or by combining two or more types. Among these aromatic vinyl-based monomers, styrene is preferred.

As the vinyl cyanide-based monomer, for example, acrylonitrile, methacrylonitrile and the like are exemplified. The vinyl cyanide-based monomer can be used singly or by combining two or more types. Among these vinyl cyanide-based monomers, acrylonitrile is preferred.

As (meth)acrylic ester-based monomers that can be selected as the monomer (a-2), for example, methyl (meth)acrylate, 2-ethylhexyl(meth)acrylate, ethyl (meth)acrylate, butyl (meth)acrylate and the like are exemplified. The (meth)acrylic ester-based monomer can be used singly or by combining two or more types.

As the maleimide-based monomer, for example, maleimide, methylmaleimide, ethylmaleimide, N-phenylmaleimide and the like are exemplified. The maleimide-based monomer can be used singly or by combining two or more types.

In the present invention, it is further possible to use, together with the above-mentioned monomers, other vinyl-based monomers capable of copolymerization, e.g., unsaturated carboxylic acids or anhydrides thereof (e.g., acrylic acid, methacrylic acid, maleic acid anhydride, etc.), amide-based monomers (e.g., acrylamide, methacrylamide, etc.), and the like within a range not obstructing the effects thereof. The other vinyl-based monomers can each be used singly or by combining two or more types.

Next, the (co)polymer (B) will be explained. The (co)polymer (B) is a (co)polymer arrived at by polymerizing at least one type of monomer selected from the group consisting of aromatic vinyl-based monomers, vinyl cyanide-based monomers, (meth)acrylic ester-based monomers and maleimide-based monomers; however, as the monomer used, it is possible to use the same monomers as the respective monomers mentioned as examples used in the graft copolymer (A).

The (co)polymer (B) preferably contains a polymer obtained by polymerizing monomers including styrene, acrylonitrile, α-methylstyrene and/or maleimide-based monomers, and more preferable contains a polymer obtained by polymerizing monomers including α-methylstyrene and/or maleimide-based monomers.

The (co)polymer (B) particularly preferably contains an acrylonitrile-styrene copolymer, styrene-N-phenylmaleimide copolymer, and/or α-methylstyrene-acrylonitrile copolymer, and most preferably contains styrene-N-phenylmaleimide copolymer and/or α-methylstyrene-acrylonitrile copolymer.

It should be noted that, although not particularly limited in the intrinsic viscosity of the (co)polymer (B) (measured at 25° C. as 0.2 g/100 cc N,N-dimethylformamide solution), it is preferably 0.2 to 1.2. Furthermore, there is no limitation in the polymerization method of the above-mentioned (co)polymer (B), and it is possible to employ a known emulsion polymerization method, bulk polymerization method, solution polymerization method, suspension polymerization method or a method combining any of these polymerization methods.

The thermoplastic resin composition for vehicle lamp housings of the present invention contains 5 to 80 parts by weight of the aforementioned graft copolymer (A), and 20 to 95 parts by weight of the (co)polymer (B) (provided that the total of (A) and ( ) is 100 parts by weight). With the graft copolymer (A) at less than 5% by weight, the impact resistance is inferior, and if exceeding 95 parts by weight, the moldability is inferior, and thus not preferred. Preferably, the graft copolymer (A) is 10 to 80 parts by weight and the (co)polymer (B) is 20 to 80 parts by weight (provided that the total of (A) and (B) is 100 parts by weight).

The thermoplastic resin composition for vehicle lamp housings of the present invention requires a content of total volatiles at 260° C. to be no more than 0.7% by weight of this overall composition. The total volatiles at 260° C. is the matter of a general term for volatile organic compounds (VOC) generated from the resin composition upon heating the resin composition at 260° C. (in other words, left in the resin composition at normal temperature), and includes monomers such as aromatic hydrocarbons, aliphatic hydrocarbons, cyclic alkanes, terpenes, alcohols, ketones, halogenated hydrocarbons and esters having a molecular weight less than 200, and oligomers configured from dimers, trimers, etc. of the respective monomers used for polymerizing this resin compound, and having a weight average molecular weight of 200 to 1000. (Hereinafter, monomers remaining in the resin will be referred to as residual monomer, and oligomers as residual oligomer.) In other words, the total volatiles at 260° C. being no more than 0.7% by weight of the overall composition means that the volatile component (total amount of residual monomer and residual oligomer) generated while heating this resin composition at 260° C. is no more than 0.7% by weight.

If the content of total volatiles at 260° C. is greater than 0.7% by weight, the diffuse reflectance at an early stage and the diffuse reflectance during continuous molding will be inferior. The content of total volatiles at 260° C. is preferably no more than 0.5% of the overall composition.

Furthermore, the thermoplastic resin composition for vehicle lamp housings of the present invention requires residual oligomer having a weight average molecular weight of 200 to 1000 being no more than 0.3% by weight. If the residual oligomer is more than 0.3% by weight, the diffuse reflectance at an early stage and the diffuse reflectance during continuous molding will be inferior. The residual oligomer is preferably no more than 0.1% by weight.

Although the content of volatiles can also be measured at less than 260° C., e.g., 200° C., the diffuse reflectance after continuous molding may be inferior, even if the content of total volatiles at 200° C. is no more than 0.7% by weight and the content of residual oligomer is no more than 0.3% by weight. As a result, measuring the content of total volatiles at less than 260° C., e.g., 200° C., does not have much meaning upon determining whether or not a suitable lamp housing molded article is obtained, and thus is not preferable in the aspect of causing the workload in quality control of the resin composition to increase.

As methods to decrease the residual monomer and residual oligomer in the resin composition to desired amounts, methods that appropriately change the composition of monomer while polymerizing the respective copolymers, addition method of monomer (batch addition method, divided addition method, continuous addition method, etc.), the polymerization temperature (constant temperature polymerization, raising temperature polymerization, etc.), post-polymerization cure temperature, post-polymerization cure time, type of polymerization catalyst, added amount of polymerization catalyst, addition method of polymerization catalyst (batch addition method, divided addition method, continuous addition method, etc.) are exemplified. In addition, methods that increase the degassing process in an extruder or the like, or raise the degree of vacuum of degassing, while kneading the resin composition or during pelletization are preferred.

In the thermoplastic resin composition for vehicle lamp housings of the present invention, various additives, e.g., known oxidation inhibitors, photostabilizers, lubricants, plasticizers, antistatic agents, pigments, flame retardants, delustering agents, fillers, etc., can be appropriately added as necessary. In addition, upon mixing, it is possible to use a known kneading device such as an extruder, a roll, a Banbury mixer, a kneader, or the like.

The thermoplastic resin composition for vehicle lamp housings obtained in such a way naturally can be used independently; however, it is also possible to use by mixing with another thermoplastic resin as necessary. As such another thermoplastic resin, for example, polycarbonate resin, polybutylene terephthalate resin, polyethylene terephthalate resin, polyamide resin, rubber reinforced polystyrene (HIPS resin), acrylonitrile-butadiene-styrene resin (ABS resin), acrylonitrile-ethylene/propylene-styrene resin (AES resin), methyl methacrylate-butadiene-styrene resin (MBS resin), and the like are exemplified.

Furthermore, the thermoplastic resin composition for vehicle lamp housings can be molded as various molded components by way of a known molding method, e.g., injection molding, blow molding, press molding, etc.

EXAMPLES

Although the present invention will be specifically explained hereinafter by showing examples, the present invention is not to be in any way limited by these. It should be noted that the "parts" and "%" indicated in the Examples are based on weight.

Examples 1 to 5 and Comparative Examples 1 to 5

One part of carbon #45B (made by Mitsubishi Chemical Corporation) was mixed with the graft copolymer (A), copolymer (B) and silicone oil in the composition ratios shown in Tables 2 and 3. Pellets colored black were obtained by melting kneading at 240° C. using a 40 mm twin screw extruder, and pelletizing. Upon pelletization, the residual amount of total volatiles was controlled by the presence or absence of degassing enhancement in the twin screw extruder. It should be noted that each of the components shown in Tables 2 and 3 is as follows.

Production of Acrylic Ester-Based Rubbery Polymer (a-1-1)

To a nitrogen exchanged glass reactor, 150 parts by weight of deionized water, 15 parts by weight of butyl acrylate, 0.05 parts by weight of allyl methacrylate, 0.15 parts by weight (solid content conversion) of dipotassium alkenyl succinate (LATEMUL ASK made by Kao Chemicals), and 0.3 parts by weight of potassium persulfate were loaded, and then allowed to react for 1 hour at 65° C. Subsequently, a liquid mixture of 85 parts by weight of butyl acrylate and 0.35 parts by weight of allyl methacrylate, and an emulsifier aqueous solution in which 0.45 parts by weight (solid content conversion) of dipotassium alkenyl succinate (LATEMUL ASK made by Kao Chemicals) was dissolved in 20 parts by weight of deionized water were continuously added over 4 hours. Thereafter, polymerization was continued for 3 hours at 65° C., and then polymerization was ended, thereby obtaining the acrylic ester-based rubbery polymer (a-1-1). The weight average particle size was 180 nm, the gel content in toluene solvent was 89%, and the degree of swelling was 14.

Production of Acrylic Ester-Based Rubbery Polymer (a-1-2)

To a nitrogen exchanged glass reactor, 150 parts by weight of deionized water, 15 parts by weight of butyl acrylate, 0.05 parts by weight of allyl methacrylate, 0.05 parts by weight (solid content conversion) of dipotassium alkenyl succinate (LATEMUL ASK made by Kao Chemicals), and 0.2 parts by weight of potassium persulfate were loaded, and then allowed to react for 1 hour at 65° C. Subsequently, a liquid mixture of 85 parts by weight of butyl acrylate and 0.45 parts by weight of allyl acrylate, and an emulsifier aqueous solution in which 0.35 parts by weight (solid content conversion) of dipotassium alkenyl succinate (LATEMUL ASK made by Kao Chemicals) was dissolved in 20 parts by weight of deionized water were continuously added over 6 hours. Thereafter, polymerization was continued for 3 hours at 65° C., and then polymerization was ended, thereby obtaining the acrylic ester-based rubbery polymer (a-1-2). The weight average particle size was 320 nm, the gel content in toluene solvent was 97%, and the degree of swelling was 8.

Production of Acrylic Ester-Based Rubbery Polymer (a-1-3)

To a nitrogen exchanged glass reactor, 150 parts by weight of deionized water, 30 parts by weight of butyl acrylate, 0.05 parts by weight of allyl methacrylate, 0.05 parts by weight (solid content conversion) of dipotassium alkenyl succinate (LATEMUL ASK made by Kao Chemicals), and 0.3 parts by weight of potassium persulfate were loaded, and then allowed to react for 1 hour at 65° C. Subsequently, a liquid mixture of 70 parts by weight of butyl acrylate, 0.45 parts by weight of allyl acrylate and 0.15 parts by weight of the chain transfer agent tertiary dodecyl mercaptan, and an emulsifier aqueous solution in which 0.45 parts by weight (solid content conversion) of dipotassium alkenyl succinate (LATEMUL ASK made by Kao Chemicals) was dissolved in 20 parts by weight of deionized water were continuously added over 4 hours. Thereafter, polymerization was continued for 3 hours at 65° C., and then polymerization was ended, thereby obtaining the acrylic ester-based rubbery polymer (a-1-3). The weight average particle size was 290 nm, the gel content in toluene solvent was 75%, and the degree of swelling was 38.

Production of Acrylic Ester-Based Rubbery Polymer (a-1-4)

To a nitrogen exchanged glass reactor, 150 parts by weight of deionized water, 30 parts by weight of butyl acrylate, 0.05 parts by weight of allyl methacrylate, 0.05 parts by weight (solid content conversion) of dipotassium alkenyl succinate (LATEMUL ASK made by Kao Chemicals), and 0.3 parts by weight of potassium persulfate were loaded, and then allowed to react for 1 hour at 65° C. Subsequently, a liquid mixture of 70 parts by weight of butyl acrylate, 0.45 parts by weight of allyl acrylate and 0.15 parts by weight of the chain transfer agent tertiary dodecyl mercaptan, and an emulsifier aqueous solution in which 0.45 parts by weight (solid content conversion) of dipotassium alkenyl succinate (LATEMUL ASK made by Kao Chemicals) was dissolved in 20 parts by weight of deionized water were continuously added over 4 hours. Thereafter, polymerization was continued for 3 hours at 65° C., and then polymerization was ended, thereby obtaining the acrylic ester-based rubbery polymer (a-1-4). The weight average particle size was 430 nm, the gel content in toluene solvent was 82%, and the degree of swelling was 23.

Measurement Methods of Gel Content and Degree of Swelling

A solid body of the acrylic ester-based rubbery polymer (weight a) was immersed for 48 hours in 100 ml of toluene at 23° C., and the amount of toluene insoluble part when filtered with a 100 mesh wire mesh was measured (weight b). Furthermore, the weight after having performed vacuum drying was measured (weight c), and the gel content and degree of swelling were obtained according to the following equations.

Gel content (%)=weight after vacuum drying (weight $c$)/solid body amount (weight $a$)×100

Degree of swelling=amount of toluene insoluble part (weight $b$)/weight after vacuum drying (weight $c$)

Production of Graft Copolymer (A-1)

To a nitrogen exchanged glass reactor, 60 parts by weight by solid conversion of the acrylic ester-based rubbery polymer (a-1-1) and an aqueous solution in which 0.2 parts by weight of lactose, 0.1 parts by weight of sodium pyrophosphate dehydrate and 0.005 parts by weight of ferrous sulfate dissolved in 100 parts by weight of deionized water were added, and then the temperature was raised to 70° C. Subsequently, a liquid mixture of 12 parts by weight of acrylonitrile, 28 parts by weight of styrene and 0.05 parts of the chain transfer agent tertiary dodecyl mercaptan, and an emulsifier aqueous solution in which 1.0 parts by weight of potassium oleate and 0.3 parts by weight of cumene hydroperoxide were dissolved in 20 parts by weight of deionized water were continuously added over 5 hours. Thereafter, polymerization was continued for 3 hours, and then polymerization was ended. Subsequently, salting out, evaporating and drying were performed to obtain the graft copolymer (A-1). Upon measuring the residual monomer and residual oligomer, the residual monomer was 0.05% by weight and the residual oligomer was 0%.

Production of Graft Copolymers (A-2 to 4)

The graft copolymers (A-2 to 4) were obtained by producing similarly to the graft copolymer (A-1), except for changing the acrylic ester-based rubbery polymer, styrene and acrylonitrile as shown in Table 1. The residual monomer of graft copolymer (A-2) was 0.06% by weight and the residual oligomer was 0% by weight; the residual monomer of graft copolymer (A-3) was 0.07% by weight and the residual oligomer was 0% by weight; and the residual monomer of graft copolymer (A-4) was 0.06% by weight and the residual oligomer was 0% by weight;

Production of Copolymers (B-1 to 7)

AS Resin (B-1):

To a nitrogen exchanged reactor, a monomer mixture consisting of 75 parts of styrene, 25 parts of acrylonitrile and 0.3 parts of cumene hydroperoxide was added to 150 parts of water dissolving 1.5 parts of sodium resinate and 0.3 parts of potassium persulfate, and were polymerized at 65° C. The copolymer AS resin (B-1) was obtained after salting out, evaporating and drying. The residual monomer was 1.26% and the residual oligomer was 0%.

AS Resin (B-2):

To a nitrogen exchanged reactor, a monomer mixture consisting of 74 parts of styrene, 26 parts of acrylonitrile and 0.5 parts of tertiary dodecylmercaptan was added to 120 parts of water dissolving 0.5 parts of tricalcium phosphate and 0.1 parts of azobisisobutyronitrile. The copolymer AS resin (B-2) was obtained after washing, evaporating and drying. The residual monomer was 0.70% and the residual oligomer was 0.07%.

AS Resin (B-3):

A monomer mixture consisting of 66.2 parts by weight of styrene, 22.1 parts by weight of acrylonitrile, 11.7 parts by weight of ethylbenzene, 0.38 parts by weight of t-dodecylmercaptan and 0.1 parts by weight of per-butyl peroxide was continuously supplied to a nitrogen exchanged reactor, and polymerization was carried out at 95° C. After leading the polymerization liquid from the reactor through a separation and collection process composed of a preheater and a vacuum column, recovery and then extrusion, the copolymer AS resin (B-3) was obtained after. The residual monomer was 0.19% and the residual oligomer was 0.43%.

AS Resin (B-4):

A monomer mixture consisting of 66.2 parts by weight of styrene, 22.1 parts by weight of acrylonitrile, 11.7 parts by weight of ethylbenzene and 0.38 parts by weight of t-dodecylmercaptan was continuously supplied to a nitrogen exchanged reactor, and polymerization was carried out at 140° C. After leading the polymerization liquid from the reactor through a separation and collection process composed of a preheater and a vacuum column, recovery and then extrusion, the copolymer AS resin (B-4) was obtained. The residual monomer was 0.21% and the residual oligomer was 2.5%.

STY-imide Resin (B-5): Styrene•N-phenylmaleimide copolymer (DENKA IP MS-NC made by Denki Kagaku)

The residual monomer was 0.15% and the residual oligomer was 0%.

AMS-AN Resin (B-6):

In a nitrogen exchanged reactor, 40 parts of a mixture consisting of 73 parts by weight of α-methylstyrene, 27 parts by weight of acrylonitrile and 0.4 parts of cumene hydroperoxide were added to 150 parts of water in which 3.0 parts of sodium resinate and 0.3 parts of potassium persulfate were dissolved, polymerizing at 70° C. for 1 hour, and then the remaining 60 parts of the monomer mixture were continuously added over 3 hours at 70° C. Subsequently, curing was further carried out for 2 hours at 70° C. The AMS-AN resin (B-6) was obtained after salting out, evaporating and drying. The residual monomer was 0.90% and the residual oligomer was 0%.

AMS-AN Resin (B-7):

After adding 150 parts of water dissolving 3.0 parts sodium resinate, 0.7 parts of potassium persulfate and 0.1 parts of cumene hydroperoxide to a nitrogen exchanged reactor, and heating to 70° C., a monomer mixture consisting of 78 parts of α-methylstyrene and 5 parts of acrylonitrile was added, and were polymerized at 70° C. for 1 hour. Thereafter, 17 parts of acrylonitrile were continuously added over 6 hours at 70° C., polymerization was carried out, and curing was further carried out for 3 hours at 70° C. The AMS-AN resin (B-7) was obtained after salting out, evaporating and drying. The residual monomer was 1.76% and the residual oligomer was 0.5%.

Lubricant: Silicone Oil

Dimethyl silicone oil (SH-200-100CS made by Dow Corning Toray Co., Ltd., viscosity 100 mm²/s) was used.

TEST EXAMPLE

The following evaluation is presented using the colored pellets obtained in each of the Examples and Comparative Examples. The results thereof are shown in Tables 2 and 3, respectively.

(1) Impact resistance: Using the colored pellets obtained in each of the Examples and Comparative Examples, test pieces were molded in conformance with ISO test method 294, and the impact resistance was measured. The impact resistance measured the notched Charpy impact value with a thickness of 4 mm based on ISO 179. Units: kJ/m²

(2) Fluidity: Using the colored pellets obtained in each of the Examples and Comparative Examples, the melt volume-flow rate was measured in conformance with ISO 1133. Units: cm³/10 min (3) Measurement of Total Volatiles Content After dissolving the graft copolymer (A), copolymer (B) or colored pellets obtained in each production example in dimethylformaldehyde (hereinafter DMF), the solution was injected in a gas chromatograph, and the residual monomer and residual oligomer in the copolymer or colored pellet, which are the total volatiles at 200° C. and 260° C., were measured from the obtained chromatogram. The residual monomer exemplified herein is exemplified by toluene, ethylbenzene, 1-methylethyl benzene, 1-methylpropyl benzene, styrene, α-methylstyrene, acrylonitrile and the like, which are the respective monomers or solvents obtained in the polymerization of the above-mentioned copolymers.

In addition, the residual oligomer is exemplified by dimers and trimers such as styrene dimer, styrene trimer, α-methylstyrene dimer, styrene-acrylonitrile dimer and styrene-acrylonitrile trimer, obtained from the monomers used during polymerization.

Using the colored pellets obtained in each of the Examples and Comparative Examples, molded articles (90 mm×150 mm×3 mm) were continuously molded in 1000 shots in 60-second cycles using an injection molding machine setting the die temperature to 60° C., to prepare test pieces. Using the test pieces, measurements for gloss and diffuse reflectance were performed.

(4) Gloss (specular gloss (60°)): The gloss of molded articles was measured in conformance with ISO 2813 after 5 shots. Units: %

(5) Diffuse Reflectance: Aluminum was vapor deposited (abbreviation of undercoat treatment process; so-called direct vapor deposition) on the molded articles after 5 shots and the molded articles obtained by continuous molding 1000 shots, and an organic solvent-based acrylic paint was coated using an air spray gun as a top coat.

For the coated molded articles, the diffuse reflectance (total reflectance−specular reflectance) was measured using a digital reflectometer (angle of reflectance: 45°). The diffuse reflectance of molded articles after 5 shots and the diffuse reflectance of molded articles obtained by continuous molding 1000 shots were respectively measured, and the rate of increase (%) in diffuse reflectance was obtained.

TABLE 1

| Graft copolymer (A) | | | A-1 | A-2 | A-3 | A-4 |
|---|---|---|---|---|---|---|
| Acrylic ester-based rubbery polymer (a-1) | a-1-1 | Parts | 60 | | | |
| | a-1-2 | Parts | | 50 | | |
| | a-1-3 | Parts | | | 50 | |
| | a-1-4 | Parts | | | | 50 |
| | Weight average particle size | nm | 180 | 320 | 290 | 430 |
| | Gel content | % | 89 | 97 | 75 | 82 |
| | Degree of swelling | | 14 | 8 | 38 | 23 |
| Vinyl monomer (a-2) | Acrylonitrile | Parts | 12 | 15 | 15 | 15 |
| | Styrene | Parts | 28 | 35 | 35 | 35 |

TABLE 2

| | Example | | | | |
|---|---|---|---|---|---|
| | 1 | 2 | 3 | 4 | 5 |
| <Composition> Graft copolymer (A) | | | | | |
| A-1 | 30 | 35 | | | |
| A-2 | | | 30 | 35 | |
| A-3 | | | | | 35 |
| Copolymer (B) | | | | | |
| B-1 | 60 | | | | |
| B-2 | | 55 | 60 | | |
| B-3 | | | | 35 | 35 |
| B-5 | 10 | 10 | 10 | | |
| B-6 | | | | 30 | 30 |
| Silicone oil | 0.1 | 0.1 | 0.1 | 0.1 | 0.1 |
| <Pelletizing conditions> | | | | | |
| Degassing enhancement | Present | Present | Present | Present | Present |
| <Properties> | | | | | |
| (1) Impact resistance (KJ/m²) | 11 | 14 | 10 | 12 | 13 |
| (2) Fluidity (cm³/10 min) | 17 | 14 | 15 | 11 | 10 |
| (3) Total volatiles amount (%) at 260° C. | 0.58 | 0.35 | 0.37 | 0.55 | 0.55 |
| Residual monomer amount (%) | 0.58 | 0.35 | 0.37 | 0.39 | 0.39 |
| Residual oligomer amount (%) | 0 | 0 | 0 | 0.16 | 0.16 |
| (3) Total volatiles amount (%) at 200° C. | 0.50 | 0.27 | 0.29 | 0.19 | 0.19 |
| Residual monomer amount (%) | 0.50 | 0.27 | 0.29 | 0.18 | 0.18 |
| Residual oligomer amount (%) | 0 | 0 | 0 | 0.01 | 0.01 |
| (4) Gloss (%) | 99 | 99 | 98 | 97 | 89 |
| (5) diffuse reflectance (%) | | | | | |
| After 5 shots | 2.7 | 2.9 | 3.2 | 3.4 | 3.8 |
| After 1000 shots | 2.9 | 3.1 | 3.4 | 3.7 | 4.2 |
| Rate of increase (%) | 7 | 7 | 6 | 9 | 10 |

TABLE 3

| | Comparative Example | | | | |
|---|---|---|---|---|---|
| | 1 | 2 | 3 | 4 | 5 |
| <Composition> Graft copolymer (A) | | | | | |
| A-1 | 30 | | | | 30 |
| A-2 | | 30 | | | |
| A-3 | | | 30 | | |
| A-4 | | | | 35 | |

TABLE 3-continued

|  | Comparative Example | | | | |
|---|---|---|---|---|---|
|  | 1 | 2 | 3 | 4 | 5 |
| Copolymer (B) | | | | | |
| B-1 | 60 | | | | |
| B-3 | | | 25 | | 50 |
| B-4 | | 60 | | 35 | 10 |
| B-5 | 10 | 10 | | | 10 |
| B-6 | | | | 30 | |
| B-7 | | | 45 | | |
| Silicone oil | 0.1 | 0.1 | 0.1 | 0.1 | 0.1 |
| <Pelletizing conditions> | | | | | |
| Degassing enhancement | Absent | Present | Present | Present | Present |
| <Properties> | | | | | |
| (1) Impact resistance (KJ/m$^2$) | 11 | 8 | 6 | 11 | 11 |
| (2) Fluidity (cm$^3$/10 min) | 18 | 16 | 7 | 8 | 17 |
| (3) Total volatiles amount (%) at 260° C. | 0.81 | 1.69 | 1.09 | 1.14 | 0.56 |
| Residual monomer amount (%) | 0.81 | 0.25 | 0.76 | 0.39 | 0.10 |
| Residual oligomer amount (%) | 0 | 1.44 | 0.33 | 0.75 | 0.46 |
| (3) Total volatiles amount (%) at 200° C. | 0.70 | 0.18 | 0.40 | 0.22 | 0.09 |
| Residual monomer amount (%) | 0.70 | 0.10 | 0.38 | 0.18 | 0.07 |
| Residual oligomer amount (%) | 0 | 0.08 | 0.02 | 0.04 | 0.02 |
| (4) Gloss (%) | 99 | 98 | 88 | 86 | 99 |
| (5) diffuse reflectance (%) | | | | | |
| After 5 shots | 3.7 | 4.4 | 4.7 | 5.9 | 3.8 |
| After 1000 shots | 5.5 | 6.7 | 6.1 | 8.8 | 6.0 |
| Rate of increase (%) | 49 | 52 | 30 | 49 | 58 |

As shown in Tables 1 and 2, the thermoplastic resin composition for vehicle lamp housings of the present invention excels in balance between impact resistance and fluidity as well as gloss, and furthermore, the diffuse reflectance was maintained at both the initial stage and after continuous molding, which were favorable results. In addition, it is found that, for articles having a gel content and degree of swelling within the specified ranges, the gloss and the diffuse reflectance of the molded articles at an initial stage and after continuous molding are particularly superior.

As shown in Table 3, in a case of using a copolymer containing total volatiles in abundance, or not carrying out degassing enhancement when producing the resin composition, the amount of total volatiles in the final composition obtained is greater than 0.7% by weight, or the residual oligomer having a weight average molecular weight or 200 to 1000 is greater than 0.3% by weight; therefore, the diffuse reflectance at an initial stage when making the molded article and the diffuse reflectance after 1000 shots were inferior. In particular, the diffuse reflectance at an initial stage was good for Comparative Example 5 in which the content of residual oligomer was greater than 0.3% by weight, despite the total volatiles being no more than 0.7% by weight; however, the diffuse reflectance after 1000 shots was poor, and thus a result of being inferior in continuous molding properties was obtained. Furthermore, Comparative Example 4 using the acrylic ester-based rubbery polymer having a weight average particle size greater than 400 nm was inferior in property balance and gloss.

Although the content of total volatiles at 200° C. was no more than 0.7% by weight, and the residual oligomer was no more than 0.3% by weight, all of the Comparative Examples resulted in the diffuse reflectance after continuous molding being inferior. Based on this point as well, it is shown that only reducing the total volatiles in the resin composition at 200° C. is not sufficient in order to obtain a molded article excelling in diffuse reflectance after continuous molding.

INDUSTRIAL APPLICABILITY

The present invention is a thermoplastic resin composition for vehicle lamp housings giving a molded article excelling in diffuse reflectance at an initial stage and during continuous molding, and excelling in the balance of impact resistance and fluidity as well as in gloss due to the evolved amount of volatiles being extremely low. This thermoplastic resin composition is suitable as a material of a vehicle lamp housing molded article.

The invention claimed is:

1. A thermoplastic resin composition for vehicle lamp housings, comprising:
   a single graft copolymer (A) present in 5 to 80 parts by weight; and
   20 to 95 parts by weight of a (co)polymer (B), where a total of (A) and (B) is 100 parts by weight,
   wherein, the graft copolymer (A) is a copolymer of an acrylic ester-based rubbery polymer (a-1) and at least one graft monomer (a-2) selected from the group consisting of aromatic vinyl-based monomers, vinyl cyanide-based monomers, and (meth)acrylic ester-based monomers and maleimide-based monomers,
   the acrylic ester-based rubbery polymer (a-1) comprises at least one emulsifier, wherein the emulsifier is selected from the group consisting of sodium dodecylbenzenesulfonate, sodium oleate, dipotassium alkenyl succinate and polyoxyethylene nonylphenyl ether,
   a degree of swelling of the acrylic ester-based rubbery polymer (a-1) in toluene solvent is 6 to 35,
   a weight average particle size of the acrylic ester-based rubbery polymer (a-1) is from 100 nm to 400 nm,
   the (co)polymer (B) is a (co)polymer of at least one monomer (a-2) selected from the group consisting of aromatic vinyl-based monomers, vinyl cyanide-based monomers, (meth)acrylic ester-based monomers and malemide-based monomers,
   a content of total volatiles at 260° C. is no more than 0.7% by weight of the composition overall, and a content of oligomer component having a weight average molecular weight of 200 to 1000 is no more than 0.3% by weight of the composition overall, and
   the content of the oligomer component is measured at 260° C.

2. The thermoplastic resin composition for vehicle lamp housings according to claim 1, wherein a gel content of the acrylic ester-based rubbery polymer (a-1) in toluene solvent is at least 80%.

3. A lamp housing molded article produced from the thermoplastic resin composition for vehicle lamp housings according to claim 1.

4. A lamp housing molded article produced from the thermoplastic resin composition for vehicle lamp housings according to claim 2.

* * * * *